US012644854B2

(12) United States Patent
Coton et al.

(10) Patent No.: US 12,644,854 B2
(45) Date of Patent: Jun. 2, 2026

(54) PROBE CHAMBER FOR INLINE MEASUREMENTS

(71) Applicant: Merck Patent GmbH, Darmstadt (DE)

(72) Inventors: Thomas Coton, Illkirch-Graffenstaden (FR); Laurent Jourdainne, Stutzheim-Offenhein (FR)

(73) Assignee: Merck Patent GmbH, Darmstadt (DE)

( * ) Notice: Subject to any disclaimer, the term of this patent is extended or adjusted under 35 U.S.C. 154(b) by 907 days.

(21) Appl. No.: 17/773,928

(22) PCT Filed: Jan. 29, 2021

(86) PCT No.: PCT/EP2021/052113
§ 371 (c)(1),
(2) Date: May 3, 2022

(87) PCT Pub. No.: WO2021/152094
PCT Pub. Date: Aug. 5, 2021

(65) Prior Publication Data
US 2022/0373497 A1      Nov. 24, 2022

(30) Foreign Application Priority Data

Jan. 30, 2020     (EP) ..................................... 20305083

(51) Int. Cl.
B01L 7/00          (2006.01)
B01D 15/08       (2006.01)
(Continued)

(52) U.S. Cl.
CPC ............. G01N 27/283 (2013.01); G01K 1/14 (2013.01); G01N 27/07 (2013.01);
(Continued)

(58) Field of Classification Search
CPC .. G01N 27/283; G01N 27/07; G01N 27/4165; G01N 27/4167; G01N 35/00693;
(Continued)

(56) References Cited

U.S. PATENT DOCUMENTS 9,028,779 B2      5/2015  Olivier
2003/0226391 A1*  12/2003  Sanderson ........... G01N 1/4077
73/864.22
(Continued)

FOREIGN PATENT DOCUMENTS

CN           109085228 A  * 12/2018   ........... G01N 27/416
DE           4034072 A1      4/1992
(Continued)

OTHER PUBLICATIONS

Europlas "https://europlas.com.vn/en-US/blog-1/pa6-vs-pa66-the-differences-between-two-engineering-giants", downloaded on Jul. 9, 2025 (Year: 2025).*
(Continued)

*Primary Examiner* — Jennifer Wecker
*Assistant Examiner* — Oyeleye Alexander Alabi
(74) *Attorney, Agent, or Firm* — EMD Millipore Corporation

(57)          ABSTRACT

A probe chamber that includes a holder having a bore capable of holding a sensor or probe; a chamber housing having a central bore in fluid communication with the bore of the holder, wherein the chamber housing can be joined with the holder; and a measurement chamber in fluid communication with the central bore, wherein the measurement chamber comprises a gate, an inlet and an outlet and is capable of receiving a probe tip or sensor tip. Methods for calibrating a probe or sensor are also disclosed.

20 Claims, 8 Drawing Sheets

(51) Int. Cl.

| | |
|---|---|
| *B01F 33/302* | (2022.01) |
| *B01F 33/3033* | (2022.01) |
| *B01J 20/285* | (2006.01) |
| *B01J 20/287* | (2006.01) |
| *B01J 20/32* | (2006.01) |
| *B01L 3/00* | (2006.01) |
| *B01L 9/00* | (2006.01) |
| *B65G 47/80* | (2006.01) |
| *B82Y 20/00* | (2011.01) |
| *B82Y 30/00* | (2011.01) |
| *B82Y 40/00* | (2011.01) |
| *C08L 5/08* | (2006.01) |
| *C12M 1/34* | (2006.01) |
| *C12M 3/06* | (2006.01) |
| *C12N 1/14* | (2026.01) |
| *C12N 1/20* | (2026.01) |
| *C12Q 1/02* | (2006.01) |
| *C12Q 1/6806* | (2018.01) |
| *C12Q 1/6844* | (2018.01) |
| *C12Q 1/6848* | (2018.01) |
| *C12Q 1/686* | (2018.01) |
| *G01K 1/14* | (2021.01) |
| *G01N 1/44* | (2006.01) |
| *G01N 15/10* | (2024.01) |
| *G01N 15/14* | (2024.01) |
| *G01N 15/1433* | (2024.01) |
| *G01N 21/01* | (2006.01) |
| *G01N 21/03* | (2006.01) |
| *G01N 21/29* | (2006.01) |
| *G01N 21/33* | (2006.01) |
| *G01N 21/65* | (2006.01) |
| *G01N 21/77* | (2006.01) |
| *G01N 27/07* | (2006.01) |
| *G01N 27/28* | (2006.01) |
| *G01N 27/416* | (2006.01) |
| *G01N 30/02* | (2006.01) |
| *G01N 30/60* | (2006.01) |
| *G01N 30/72* | (2006.01) |
| *G01N 31/12* | (2006.01) |
| *G01N 33/543* | (2006.01) |
| *G01N 33/557* | (2006.01) |
| *G01N 33/564* | (2006.01) |
| *G01N 33/574* | (2006.01) |
| *G01N 33/58* | (2006.01) |
| *G01N 33/68* | (2006.01) |
| *G01N 35/00* | (2006.01) |
| *H05B 45/10* | (2020.01) |

(52) U.S. Cl.
CPC ..... *G01N 27/4165* (2013.01); *G01N 27/4167* (2013.01); *G01N 35/00693* (2013.01); *G01N 2021/0193* (2013.01); *G01N 2021/0371* (2013.01)

(58) Field of Classification Search
CPC ... G01N 2021/0193; G01N 2021/0371; G01N 27/416; G01K 1/14
See application file for complete search history.

(56) References Cited

U.S. PATENT DOCUMENTS

| | | | |
|---|---|---|---|
| 2004/0087031 A1* | 5/2004 | Simon, Jr. .......... | G01N 27/4167 436/100 |
| 2005/0220169 A1* | 10/2005 | McGowan-Scanlon ..................... | G01N 33/1886 374/E1.018 |
| 2013/0182745 A1* | 7/2013 | Hertel ...................... | G01K 7/16 374/185 |
| 2014/0350862 A1* | 11/2014 | Bond ..................... | G01D 11/26 702/19 |
| 2015/0217882 A1 | 8/2015 | Olivier | |
| 2018/0334698 A1* | 11/2018 | Eubisch ................... | A61L 2/07 |
| 2019/0120667 A1* | 4/2019 | Gagne ................... | G01D 11/30 |

FOREIGN PATENT DOCUMENTS

| | | | | |
|---|---|---|---|---|
| DE | 19546266 A1 | 6/1997 | | |
| DE | 102011013003 A1 | 9/2012 | | |
| JP | H08-320303 A | 12/1996 | | |
| JP | H09-243588 A | 9/1997 | | |
| JP | 2010-145397 A | 7/2010 | | |
| JP | 2018-031789 A | 3/2018 | | |
| WO | WO-9002939 A1 * | 3/1990 | .......... | G01N 27/283 |
| WO | WO-2012119881 A1 * | 9/2012 | .......... | G01N 27/283 |
| WO | 2021/131521 A1 | 7/2021 | | |
| WO | 2021/152094 A1 | 8/2021 | | |

OTHER PUBLICATIONS

Office Action received for Japanese Patent Application No. 2022-540859 mailing date Aug. 22, 2023, 13 Pages (7 Pages of English Translation and 6 Pages of Official Copy).

First Examination Report received for Indian Application No. 202217033102 mailing date May 30, 2023, 8 Pages.

International Search Report and Written Opinion for International Application No. PCT/EP2021/052113, dated Jul. 9, 2021, 15 pages.

Office Action received for Japanese Patent Application No. 2022-540859 mailing date Feb. 6, 2024, 9 Pages (4 Pages of English translation & 5 Pages of official copy).

International Preliminary Report on Patentability received for PCT Application No. PCT/EP2021/052113 mailing date Aug. 11, 2022, 9 Pages.

Communication Pursuant to Article 94(3) EPC received for European Patent Application No. 21716264.3 mailing date Jul. 10, 2024, 6 Pages.

* cited by examiner

PROBE CHAMBER FOR INLINE MEASUREMENTS

RELATED APPLICATIONS

The present application is a U.S. National Stage application of International Application No. PCT/EP2021/052113, filed Nov. 29, 2021, which claims the benefit of EP Priority Patent Application No. 20305083.6, filed Jan. 30, 2020, each of which is incorporated herein in its entirety.

BACKGROUND

Field of the Disclosure

This disclosure relates to the measurement of properties of fluids. More particularly, embodiments of the disclosure relate to chambers and housings for probes and/or sensors for the measurement of fluids.

Description of the Prior Art

Biological fluids are mixed in solutions in the bioprocessing industry. Homogeneous mixing is a particular goal. However, measuring of various fluid properties, e.g., degree of homogeneity, concentration, etc., is a challenge. Fluids may have localized disparities with respect to physical properties. Furthermore, measuring the physical properties of fluids in situ can present further disparities given small sample sizes traversing discrete, low-flow areas. The bioprocessing systems may contain conduits, typically part of a closed system, having fluid flow therethrough, and sampling through such conduits presents sampling problems.

In typical biomedical processes, i.e., processing of monoclonal antibodies, capsids, cell lines, inline viral inactivation processes, and the like, measurements are taken from within a tank (e.g., a static measurement) or from within fluid streams (e.g., several liters to tens of liters per minute) flowing through conduits of consequent inner diameter. In some cases, the measurements can be performed on a sample taken from a finished product. And, sampling itself can be another vector for introducing undesirable contaminants into a process. The requirements regarding response times, i.e., addition of processing agents, in batch processes were not onerous. More recently, trends in bioprocessing are biased toward providing continuous processing, making sampling, measurements, and process monitoring and control based on those measurements more time- and sampling-sensitive and commensurately more challenging.

Measurements in the demanding conditions of continuous processes requires the development of, at least, either new sensors or novel manners with which to incorporate existing probes and sensors, wherein the collection of reliable and accurate data is ensured while accommodating newer requirements, i.e., quick response times for inline flow continuous processes. Measurements of chemical and/or biological properties are paramount for consistent process control. Such measurements typically require large probes. Response times are a function of the kinematics of the chemical/biological processes, which are typically slower than mechanical ones. This explains the complexity of, for e.g., conductivity or pH measurements as compared with, e.g., sensing the pressure of a fluid. Recent technologies have attempted, with existing probes and sensors for the measurement of pH, conductivity, turbidity, and temperature, to optimize and improve their accuracy, reliability and stability over long process trials. Notably, such optimizations have been developed for typical processing conditions. For example, in traditional biomedical processes to produce mAb in batch mode processing, the intrinsic features of the fluid product are measured in tanks, in significant stream flow or via samples taken at a point of the global process. Nonetheless, the accuracy of the measurement results is not solely a function of the accuracy of the sensors. The placement of sensors within a process is also a significant factor.

Another significant factor in continuous processing using feedback loops and sensors is the phenomenon of sensor drift. Sensor drifts are errors, which are defined as deviations in the performance of the sensor. The magnitude of these errors can increase over time, even if following a calibration of the sensors. Changes in temperature, e.g., of a biological fluid, room temperature, and the like, can cause thermal expansion of sensor wires, connecting cables, and of, e.g., a frequency converter within sensors. Other failure modes include environmental contamination and/or vibrations. In addition, calibration of pH sensors is often requisite in bioprocessing because the electrodes of sensors can change over time. In some processes, pH probes may need cleaning and/or calibration several times per day. To date, there is no technology that provides an easy, accurate manner for data measurement and sensor calibration in continuous processing over long periods, e.g., several hours, days and/or weeks, of time.

The use of typical probes, having reliability and accuracy, within a continuous bioprocessing environment, which can incorporate sampling ports within a chamber, allowing a simple and efficient way to recalibrate inline probes and sensors over long periods of time during processing represents an advance in the art.

SUMMARY OF SOME EMBODIMENTS

A probe or sensor chamber, comprising a measurement chamber.

A probe or sensor chamber, comprising a measurement chamber, wherein a gate, which is in fluid communication with an inlet port and the measurement chamber, is located such that the measurement chamber floods with a liquid evenly, e.g., a height of the measurement chamber fills from a bottom to a top.

A probe or sensor chamber, comprising a measurement chamber, wherein a gate, which is in fluid communication with an inlet port and the measurement chamber, is located such that an incoming fluid first contacts a probe or sensor tip prior to flooding the measurement chamber.

A probe or sensor chamber, comprising a measurement chamber having a volume that is minimized, wherein a priming of the measurement chamber and a sensor response time is minimized.

A probe or sensor chamber, comprising a measurement chamber having a volume that is minimized, wherein a priming of the measurement chamber and a sensor response time is minimized and wherein a sampling and/or calibrating method can be performed.

A probe chamber that includes a holder having a bore capable of holding a sensor or probe; a chamber housing having a central bore concentric with the bore of the holder, wherein the chamber housing can be joined with the holder; and a measurement chamber in fluid communication with the central bore, wherein the measurement chamber comprises an inlet and an outlet and is capable of receiving a probe tip or sensor tip.

In some embodiments, the probe or sensor chamber comprises a holder, a chamber housing having a measurement chamber. In some embodiments according to the disclosure, the probe or sensor chamber comprises an inlet port and an outlet port. In some embodiments, the probe or sensor chamber is adapted for measuring various physical properties of biological fluids in situ, wherein the probe or sensor chamber is in fluid communication with a biocontainer or bioreactor.

In some embodiments of the disclosure, a probe or sensor chamber comprises a holder, a chamber housing, and a measurement chamber in fluid communication therewith, further comprising a sampler. In some embodiments of the disclosure, a probe or sensor chamber comprises a holder, a chamber housing, and a measurement chamber in fluid communication, further comprising a sampler having needles capable of piercing the chamber housing, wherein the needles become in fluid communication with the measurement chamber.

In some embodiments according to the disclosure, the disclosed probe or sensor chambers herein are used for low pH virus inactivation bioprocessing. In some contexts, low pH means a pH from 5.0 to 6.0. In some bioprocessing embodiments, a low pH means from 3.0 to 7.0.

These and other embodiments, and provisions thereof, will become clear from the description, claims, and figures below. Various benefits, aspects, novel and inventive features of the present disclosure, as well as details of exemplary embodiments thereof, will be more fully understood from the following description and drawings. So the manner in which the features disclosed herein can be understood in detail, more particular descriptions of the embodiments of the disclosure, briefly summarized above, may be had by reference to the appended drawings. It is to be noted, however, that the appended drawings illustrate only some typical embodiments of this disclosure and are therefore not to be considered limiting of its scope, for the described embodiments may admit to other equally effective probe and sensor chambers. It is also to be understood that elements and features of one embodiment may be found in other embodiments without further recitation and that, where possible, identical reference numerals have been used to indicate comparable elements that are common to the figures.

As used herein, the singular forms "a," "an," and "the" include plural referents unless the context clearly dictates otherwise. Unless defined otherwise, all technical and scientific terms used herein have the same meaning as commonly understood by one of ordinary skill in the art to which these embodiments pertain.

DETAILED DESCRIPTION

The technology disclosed herein describes some embodiments of a probe chamber which includes a measurement chamber, designed to perform inline and in situ measurements. The biological fluid stream flow envelops the tip of a probe or sensing element while minimizing the amount of biological fluid to flood the measurement chamber, wherein the response time of the system is shortened. Furthermore, the design of the measurement chamber ensures a good priming of biological fluids, even at low flow rates, e.g., approximately 1 to 30 milliliters per minute of flow (mL/min), in some embodiments, 30-100 mL/min, and in some embodiments 100-2000 mL/min (and any value therebetween).

For example, for product quality reasons, during an inline virus inactivation process, a discrete and precise amount of an acid solution needs to be added and mixed within a biocontainer or bioreactor while the acid concentration is measured and controlled via a pH probe. The measurement chamber is designed to accommodate this need. Moreover, embodiments of the technology described herein realizes the benefit of employing existing optimized sensors, instead of the uncertainty commensurate with the development of new sensor technologies. Therefore, existing probes and sensors can be accommodated in appropriate conditions to perform as designed with a minimum impact on their operating characteristics.

At least some embodiments of the disclosure describe novel manners to incorporate probes within measurement chambers so they work efficiently and/or in situ despite use in continuous biomedical processes, with a minimal negative impact on accuracy, reliability, stability and response time of the measured properties. Optionally, probes and sensors and measurements chambers are incorporated within single use assemblies. Also, embodiments of the measurement chambers can be adapted to incorporate a variety of different probes and, e.g., can be used with the advent of increasingly miniaturized probes.

Figure 1:
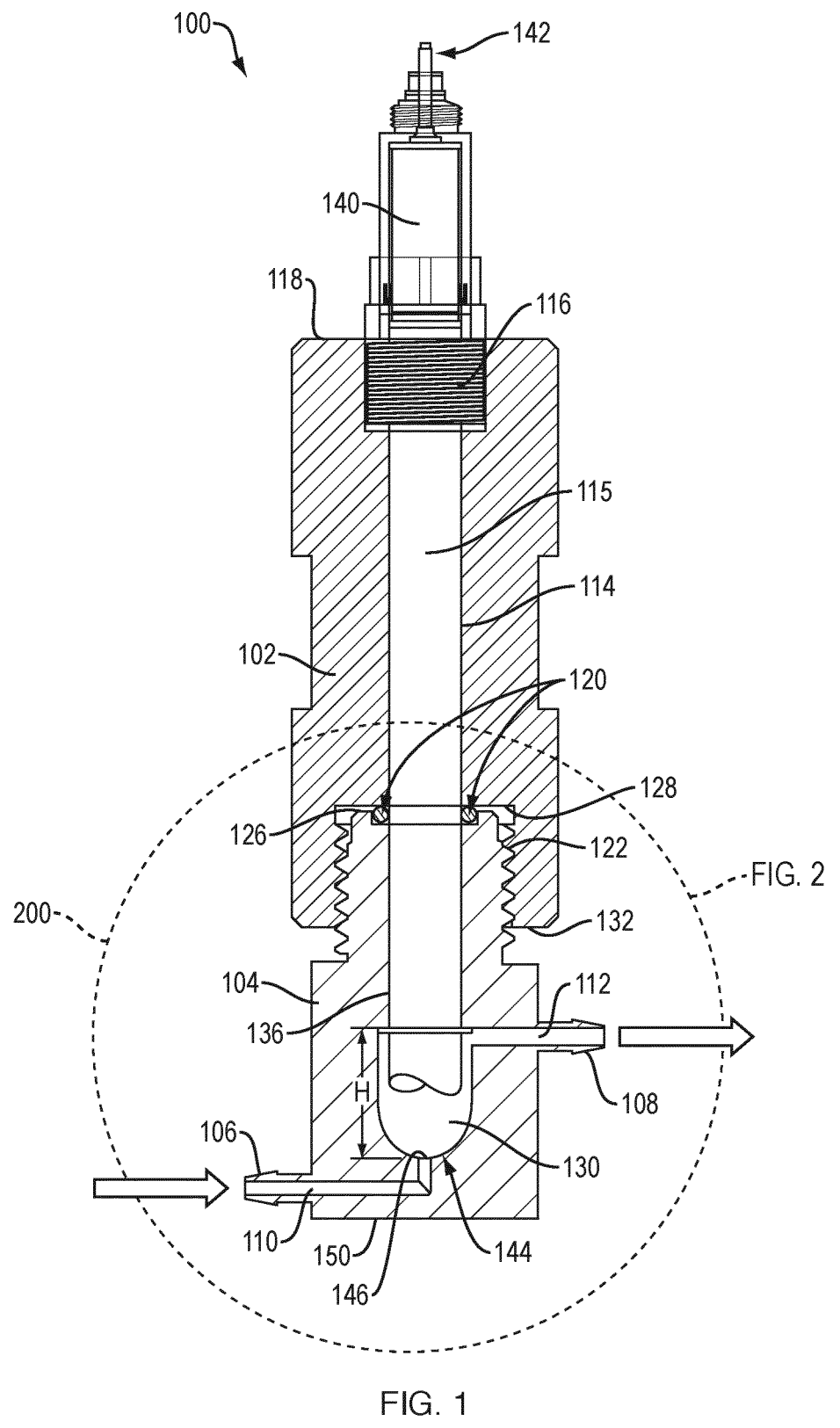
FIG. 1 depicts a front cross-section view of a probe chamber, according to embodiments of the disclosure.

FIG. 1 depicts a front cross-section view of a probe chamber 100, according to embodiments of the present disclosure. The probe chamber 100 comprises a holder 102 and a chamber housing 104, which fit together. The holder 102 comprises a probe connect area 116 at a first end 118, opposite a second end 132. As shown, the probe connect area 116 comprises a threaded boss. However, other connect structural features are possible, such as a press-fit, interference fit, a snap-fit, slotted snap-fits, lugs, and like joining methods. The probe connect area 116 partially houses a probe 115 within a bore 114 when in use. The second end 132 of the holder 102 comprises a chamber boss 122, e.g., a circular hole and, as shown, a threaded hole for joining with the chamber housing 104. The holder 102 further comprises a shoulder 128 at a distal end of the chamber boss 122. As shown, an O-ring 120, such as an elastomeric or other compliant O-ring, may be disposed between the shoulder 128 and a chamber bushing 126 to create a seal. For example, a liquid-tight seal.

The chamber housing 104 comprises a thread 134, capable of mating with the probe connect area 116, and can be a threaded boss. The chamber housing 104 may also comprise a central bore 136, which when the holder 102 and the chamber housing 104 are joined, the central bore 136 and the bore 114 are in fluid communication therewith. In some embodiments, the central bore 136 and the bore 114 may be concentric. At a proximal end 150 of the chamber housing 104, two ports exist, an inlet port 106 and an outlet port 108. The inlet port 106 comprises an inlet channel 110 while the outlet port 108 comprises an outlet channel 112. Disposed between and in fluid communication with both the inlet channel 110 and outlet channel 112 may be a measurement chamber 130. The measurement chamber 130 is also in fluid communication with the central bore 136. The measurement chamber 130 is capable of housing, for example, a probe or sensor 115 or a tip (shown below) of a probe or sensor 115 (truncated as shown). The measurement chamber 130 further comprises a gate 146, which permits the flow of a fluid into the measurement chamber 130 from the inlet channel 110. In some embodiments, the gate 146 is located so that the measurement chamber 130 floods evenly. For example, the measurement chamber 130 has a height H that fills evenly. In some embodiments, the profile of the probe or sensor 115 is substantially similar, though smaller, than a profile of the inner volume of the measurement chamber 130 having a small gap therebetween, wherein the measurement chamber 130 fills with liquid evenly irrespective of orientation, i.e., right-side up, upside down, laying 90° with respect to a longitudinal axis of the probe, the Height H, etc.

The probe or sensor 114 can be, for example, a thermocouple, a pH sensor, a turbidity or absorbance sensor, a conductivity sensor, and/or other types of sensors common to the bioprocessing industry. In use, a biological fluid, for example, from within a biocontainer or bioreactor, flows into the inlet port 106, into the measurement chamber 130 (where a physical property is measured), and out the outlet port 108. In some embodiments, the biological fluid returns to the biocontainer or bioreactor. In some embodiments, the fluid may be delivered to a filter, a chromatography column, etc., and/or other apparatus as is known to those in the art.

Also shown in FIG. 1 is a probe housing 140 having a probe wire 142, in communication with the probe 114. The probe housing 140 is screwed into the probe connect area 116. The probe tip is not shown, though it is to be understood that the probe extends through the bore 114 and the central bore 136, terminating within a measurement chamber 130. As shown, the measurement chamber 130 terminates at a circular end 144. It is to be understood that the circular end 144 may also have a different shape, e.g., a square shape. In some embodiments, the gate 146 may be located at or near a geometric center of the circular end 144 (or the surface of any shaped terminal end of the measurement chamber 130). In some embodiments, an inner volume (the volume produced by a gap between the probe or sensor and the inner surface of the measurement chamber 130) of the measurement chamber 130, having a probe or sensor 115 disposed therein, fills evenly irrespective of a location of the gate 146, i.e., no preferential fluid path.

As can be understood from the above disclosure, the designs of a measurement chamber(s) 130 are described, in which a sensitive part, i.e., a tip, of the probe or sensor is housed. The measurement chamber(s) 130 comprise a free volume for the fluid between the probe tip, e.g., the part of the probe that is emerged in a solution during use, and the chamber walls, which is minimized to ensure a small flooding time, wherein a response time delay due to the measurement chamber itself is minimized. Measurements of physical properties of the fluids are used in control loops and regulation of continuous processes. To ease priming of the measurement chamber 130, the fluid generally flows from a bottom to a top of the measurement chamber. This ensures repeatability of the measurements irrespective of probe orientation within the measurement chamber. Also, some embodiments of the holder and/or the measurement chamber 130 can be easily adapted to probes of different lengths and diameters because of a cylindrical design. The probe is, optionally, screwed onto the holder, while the holder is joined to the measurement chamber. It is to be understood that the technology described is also well suited for measurements performed with single use (SU) probes. For example, a holder and measurement chamber can comprise a gamma-compatible aseptic assembly, further comprising inlet/outlet tubes closed by aseptic connectors. The holder and measurement chamber can also comprise materials capable of withstanding an autoclaving sterilization step.

Figure 2:
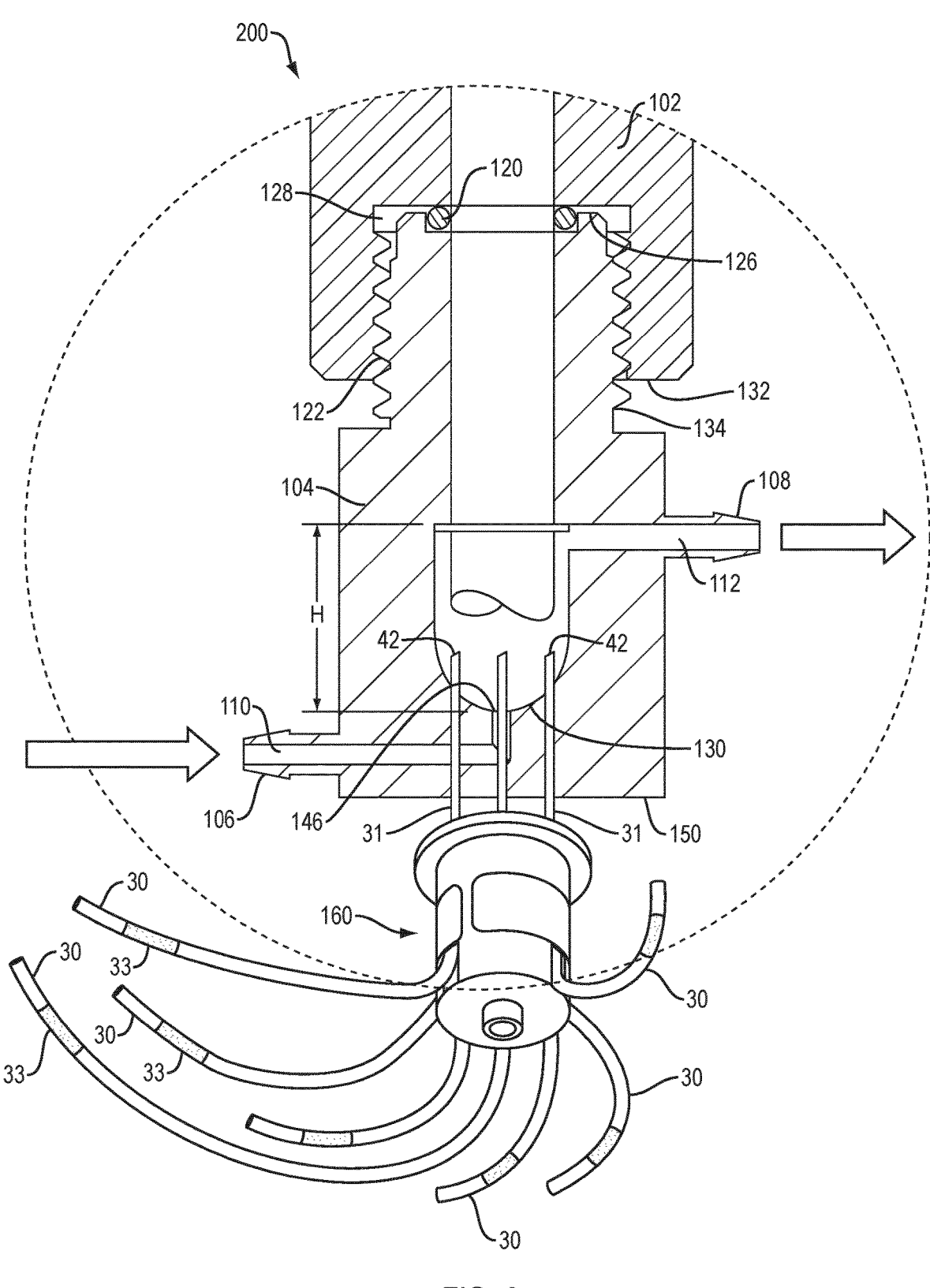
FIG. 2 depicts a close-up view of the probe chamber of FIG. 1, further comprising a sampler, according to embodiments of the disclosure.

FIG. 2 depicts a close up view 200 of the probe chamber 100 of FIG. 1, further comprising a sampler 160. As noted in FIG. 1, the probe chamber 100 comprises a holder 102 and a chamber housing 104, which fit together. The second end 132 of the holder 102 comprises a chamber boss 122, e.g., a circular hole and, as shown, a threaded hole for joining with the chamber housing 104. It is to be understood that other structural features are possible for connecting the chamber housing 104 with the holder 102, e.g., as above, a press-fit, interference fit, a snap-fit, slotted snap-fits, lugs, and like joining methods. The holder 102 further comprises a shoulder 128 at a distal end of the chamber boss 122. As shown, an O-ring 120, such as an elastomeric or other compliant O-ring, is disposed between the shoulder 128 and a chamber bushing 126 to create a seal, e.g., a liquid-tight seal.

The chamber housing 104 may comprise a central bore 136, which when the holder 102 and the chamber housing 104 are joined, the central bore 136 and the bore 114 are in fluid communication therewith. As above, the central bore 136 and the bore 114 are optionally concentric. At a proximal end 150 of the chamber housing 104, two ports exist, an inlet port 106 and an outlet port 108. The inlet port 106 comprises an inlet channel 110 while the outlet port 108 comprises an outlet channel 112. A measurement chamber 130, having a gate 146, may be disposed between and in fluid communication with both the inlet channel 110 and outlet channel 112. The measurement chamber 130 is in fluid communication with the central bore 136. As shown, the measurement chamber 130 terminates into a square shape although it is to be understood that a circular termination is within some embodiments of the disclosure. In some embodiments, the measurement chamber 130 is radiused substantially similarly to the tip of a probe 115. The measurement chamber 130 is capable of housing, for example, a tip of a probe or sensor 115. The probe or sensor 115, as above, can be, for example, a thermocouple, a pH sensor, a turbidity or absorbance sensor, a conductivity sensor, and/or other types of sensors common to the bioprocessing industry. In use, a biological fluid, for example, from within a biocontainer or bioreactor, flows into the inlet port 106, into the measurement chamber 130 (where a physical property is measured), and out the outlet port 108. In some embodiments, the biological fluid returns to the biocontainer or bioreactor. In some embodiments, the fluid may be delivered to a filter, a chromatography column, etc., and/or other apparatus as is known to those in the art. The sampler 160 comprises needles 31 having needle points 42, and tubes 30. The sampler 160 may be joined with the probe chamber 100 on the proximal end 150. In some embodiments, the proximal end 150 comprises a compliant material capable of being pierced by the needles 31 for sampling purposes.

Figure 3:
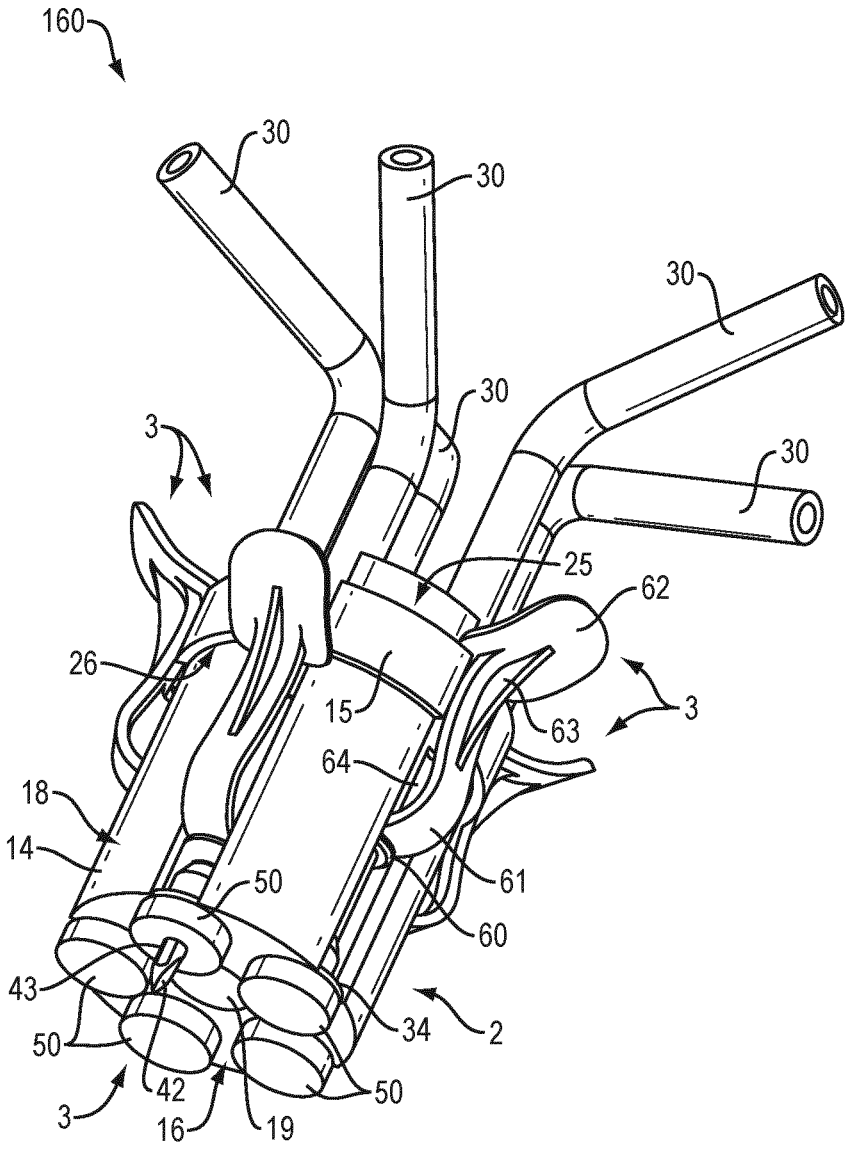
FIG. 3 depicts a perspective view of the sampler of FIG. 2, according to embodiments of the disclosure.

FIG. 3 depicts a perspective view of the sampler 160 of FIG. 2, according to embodiments of the disclosure. The sampler 160 comprises a magazine 2 and five transfer elements 3. It is to be understood that the sampler 160 can comprise any suitable number of transfer elements 3, e.g., in some embodiments, the sampler 160 comprises two, three, four, five, six, seven, eight, etc., transfer elements 3. The magazine 2 of the transfer device is cylindrical and has a body 14 and a rib 15. The body 14 has a main face 16 and an opposing face (not shown) and a lateral face 18 connecting the main face 16 and the opposing face. A tubular central cavity 19 and five cavities (not shown) beneath five discs 50 surrounding the central cavity 19 are formed in the body 14. In each of the cavities, a transfer element 3 is received, those cavities issuing at the main face 16 and an opposing face (not shown) as well as at the face 18 to form a slide track in which the transfer element 3 accommodated therein is adapted to slide. Each transfer unit 3 comprises a tube 30, a needle 31 having a needle point 42, a disc 50, which acts as a septum, a driving unit 33 for driving the needle point 42 of a needle 31, and a washer 34. The driving unit 33 comprises a tubular body 60, a flexible arm 61 and a driving key 62. The body 60 is connected to the key 62 via the flexible arm 61. The driving unit 33 also has a reinforcing rib 63, having edges 25,26 between the key 62 and the arm 61 as well as a reinforcing rib 64 between the arm 61 and the body 60 to ensure adequate strength when an operator acts on it.

Embodiments of the disclosure further include a sampling device, such as the sampler 160, releasably joined to the chamber holder, wherein a sample within the measurement chamber can be removed and, for example, delivered to a test tube. Furthermore, a fluid can be delivered to the measurement chamber, e.g., a cleaning agent or a reference fluid, such as a pH buffer solution to calibrate the probe or sensor. One such sampler may be a NovaSeptum® Single-Use holder, marketed by the EMD Millipore Corp., Burlington, Mass., USA. Samplers of this type are disclosed in commonly-assigned U.S. Pat. No. 9,028,779, the entire disclosure of which is incorporated by reference. A solution, such as a buffer, may be delivered to wet and/or calibrate the probe 115. This can be accomplished by introducing, via a syringe having a needle into the chamber and injecting a well-defined solution into. The sampler may comprise a plurality of needles 31, as shown. Any of the needles 31 allow several individual samplings from within the measurement chamber 130. This provides an in-situ method for solving sensor drift. Through the needle(s) 31, a sample of solution is taken from the measurement chamber 130, which can be directed towards, e.g., a test tube. The properties of the flow sample can then be assessed by means of reference probes and compare to the recording over the sampling time by the running sensor. The difference value computed therefrom can be used to correct the sensor drift.

Protrusion of the needle(s) 31, into the measurement chamber 130, is facilitated by using a compliant membrane, e.g., a rubber membrane, such as a silicone membrane or other thermoplastic elastomer, located adjacent to the needle(s) 31 and the chamber wall. To keep the volume of the measurement chamber low, individual "alveolus" are created into the measurement chamber 130 to host the sampling needle(s) 31. It is to be understood that individual alveolus, where a needle(s) 31 is hosted, allows sampling from, injecting into, wetting, etc., desired areas within the measurement chamber 130. Once the sampling/injection is completed, the tubing 30 is aseptically sealed with the appropriate tool at a metallic pinch pipe 33 and/or cut. It is to be further understood that embodiments described herein can be scaled to accommodate any sized or shaped probe or sensor. Moreover, embodiments described herein are suitable for high flow rates of solutions and, more specifically, are suitable for very low flow rates, e.g., approximately 1 to 30 milliliters per minute of flow (mL/min), in some embodiments, 30-100 mL/min, and in some embodiments 100-2000 mL/min. (and values therebetween). Embodiments described herein are suitable for single-use/disposable applications.

Figure 4:
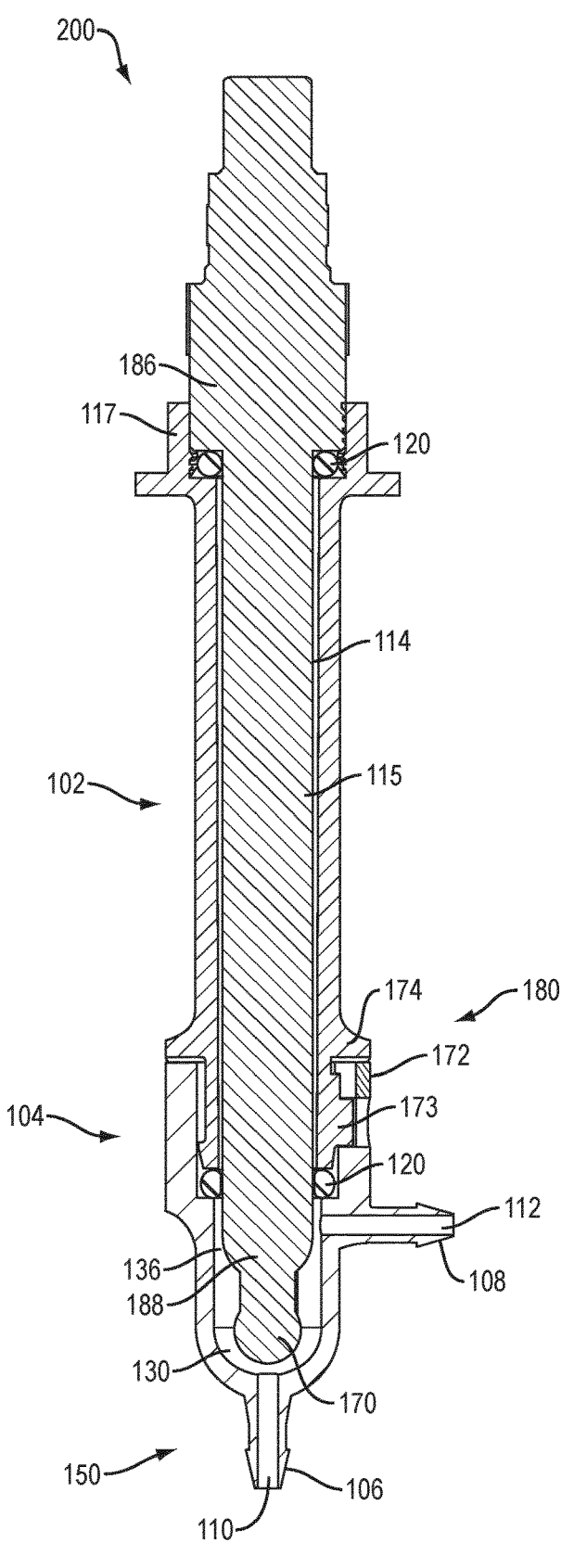
FIG. 4 depicts a front cross-section view of a probe chamber having an O-ring between a probe holder and a probe and a snap clip for joining a chamber housing and the probe holder, according to embodiments of the disclosure.

FIG. 4 depicts a front cross-section view of a probe chamber 200 having an O-ring 120 between a probe holder 102 and a probe 115 and a snap clip 180 for joining a chamber housing 104 and the probe holder 102, according to embodiments of the disclosure. The snap clip 180 comprises a shoulder 174 and a snap beam 173 on the probe holder 102, which mates with a corresponding snap beam 172 on the chamber housing 104. An O-ring 120 is disposed between a proximal portion 188, near a probe tip 170 of the probe 115 and the chamber housing 104. An O-ring 120 is disposed between a distal portion 186 of the probe 115 and a distal portion 117 of the probe holder 102. As above, the chamber housing 104 may comprise a central bore 136, which when the holder 102 and the chamber housing 104 are joined, the central bore 136 and the bore 114 are in fluid communication therewith. As above, the central bore 136 and the bore 114 are optionally concentric. At a proximal end 150 of the chamber housing 104, two ports exist, an inlet port 106 and an outlet port 108. The inlet port 106 comprises an inlet channel 110 while the outlet port 108 comprises an outlet channel 112. A measurement chamber 130 may be disposed between and in fluid communication with both the inlet channel 110 and outlet channel 112. The measurement chamber 130 is in fluid communication with the central bore 136.

Figure 5:
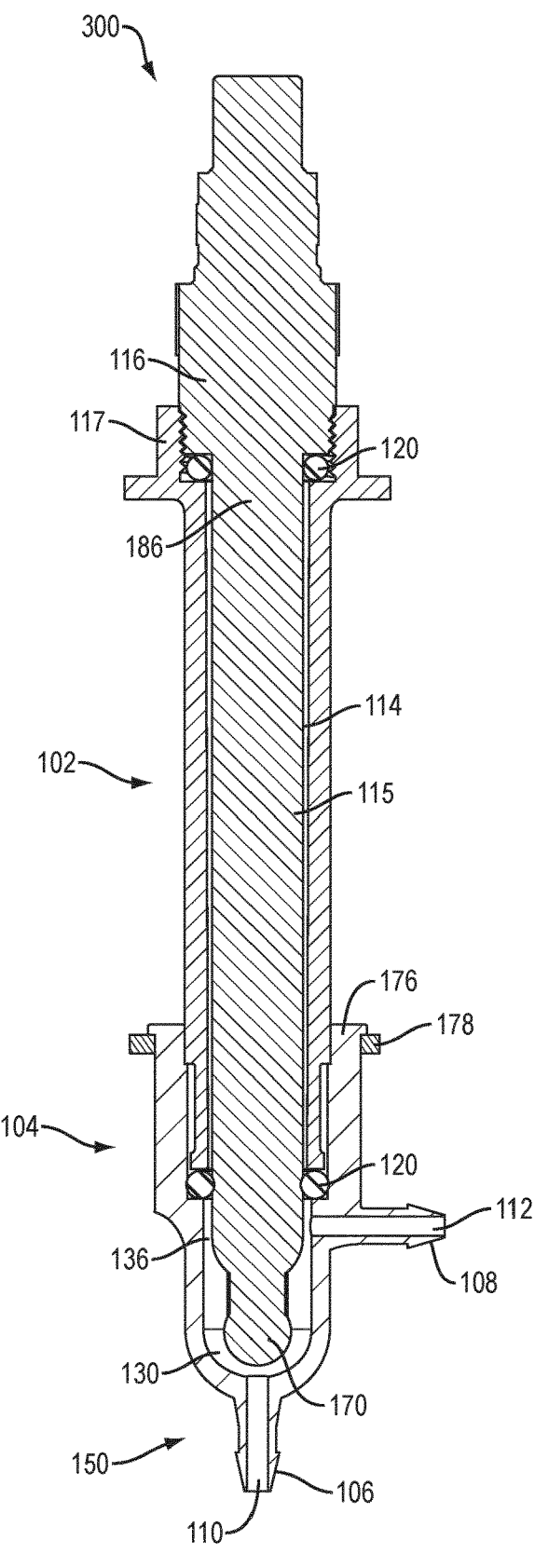
FIG. 5 depicts a front cross-section view of a probe chamber having an O-ring between a probe holder and a probe, an O-ring between a probe holder and an upper part of a probe, and a ring clip for joining a chamber housing and the probe holder, according to embodiments of the disclosure.

FIG. 5 depicts a front cross-section view of a probe chamber 300 having an O-ring between a probe holder 102 and a probe 115, an O-ring 120 between a probe holder 102 and an upper part 186 of a probe 115, and a ring clip 178 for joining a chamber housing 104 and the probe holder 102, according to embodiments of the disclosure. An O-ring 120 is disposed between a proximal portion 188, near a probe tip 170 of the probe 115 and the chamber housing 104. An O-ring 120 is disposed between a distal portion 186 of the probe 115 and a distal portion 117 of the probe holder 102. As above, the chamber housing 104 may comprise a central bore 136, which when the holder 102 and the chamber housing 104 are joined, the central bore 136 and the bore 114 are in fluid communication therewith. As above, the central bore 136 and the bore 114 are optionally concentric. At a proximal end 150 of the chamber housing 104, two ports exist, an inlet port 106 and an outlet port 108. The inlet port 106 comprises an inlet channel 110 while the outlet port 108 comprises an outlet channel 112. A measurement chamber 130 may be disposed between and in fluid communication with both the inlet channel 110 and outlet channel 112. The measurement chamber 130 is in fluid communication with the central bore 136.

Figure 6:
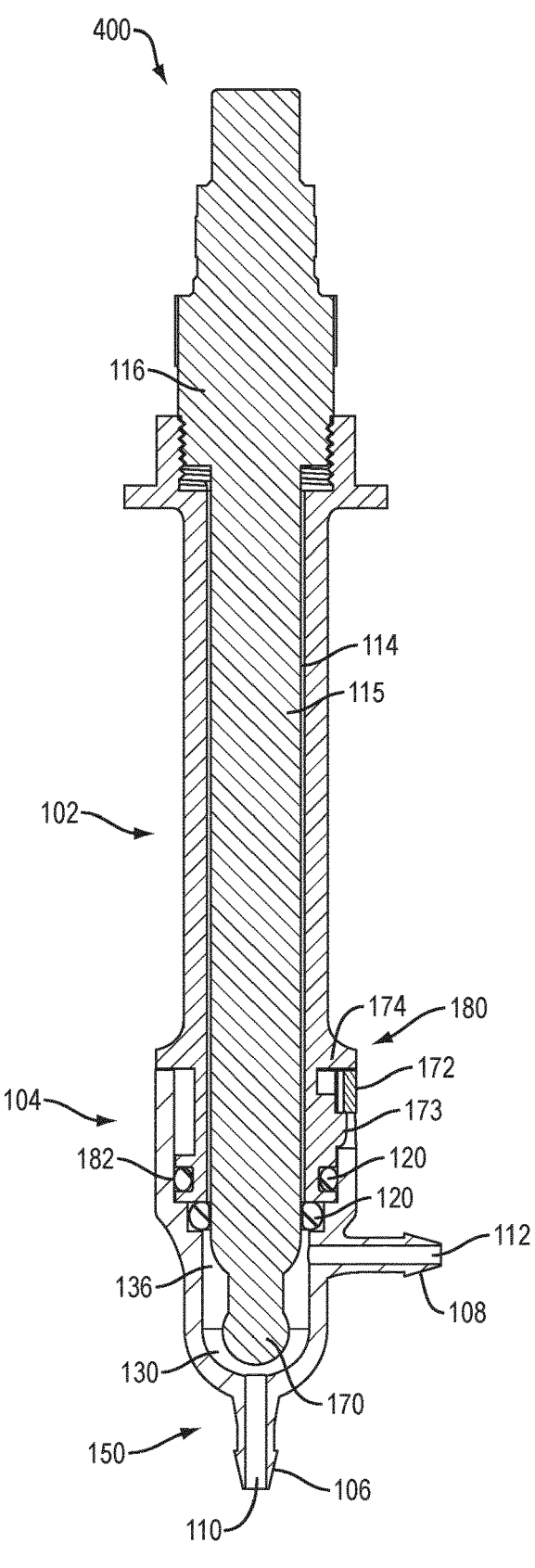
FIG. 6 depicts a front cross-section view of a probe chamber having an O-ring between a probe holder and a chamber housing, an O-ring between chamber housing and a probe, and a snap clip for joining a chamber housing and the probe holder, according to embodiments of the disclosure.

FIG. 6 depicts a front cross-section view of a probe chamber 400 having an O-ring between a probe holder 102 and a chamber housing 104, an O-ring 120 between chamber housing 104 and a probe 115, and a snap clip 180 for joining a chamber housing 104 and the probe holder 102, according to embodiments of the disclosure. The snap clip 180 comprises a shoulder 174 and a snap beam 173 on the probe holder 102, which mates with a corresponding snap beam 172 on the chamber housing 104. The probe holder 102 further comprises a groove 182 for housing an O-ring 120 adjacent to an O-ring 120 between the chamber housing 104 and the probe 115. As above, the chamber housing 104 may comprise a central bore 136, which when the holder 102 and the chamber housing 104 are joined, the central bore 136 and the bore 114 are in fluid communication therewith. As above, the central bore 136 and the bore 114 are optionally concentric. At a proximal end 150 of the chamber housing 104, two ports exist, an inlet port 106 and an outlet port 108. The inlet port 106 comprises an inlet channel 110 while the outlet port 108 comprises an outlet channel 112. A measurement chamber 130 may be disposed between and in fluid communication with both the inlet channel 110 and outlet channel 112. The measurement chamber 130 is in fluid communication with the central bore 136, depicting a probe tip 170 therein.

Figure 7:
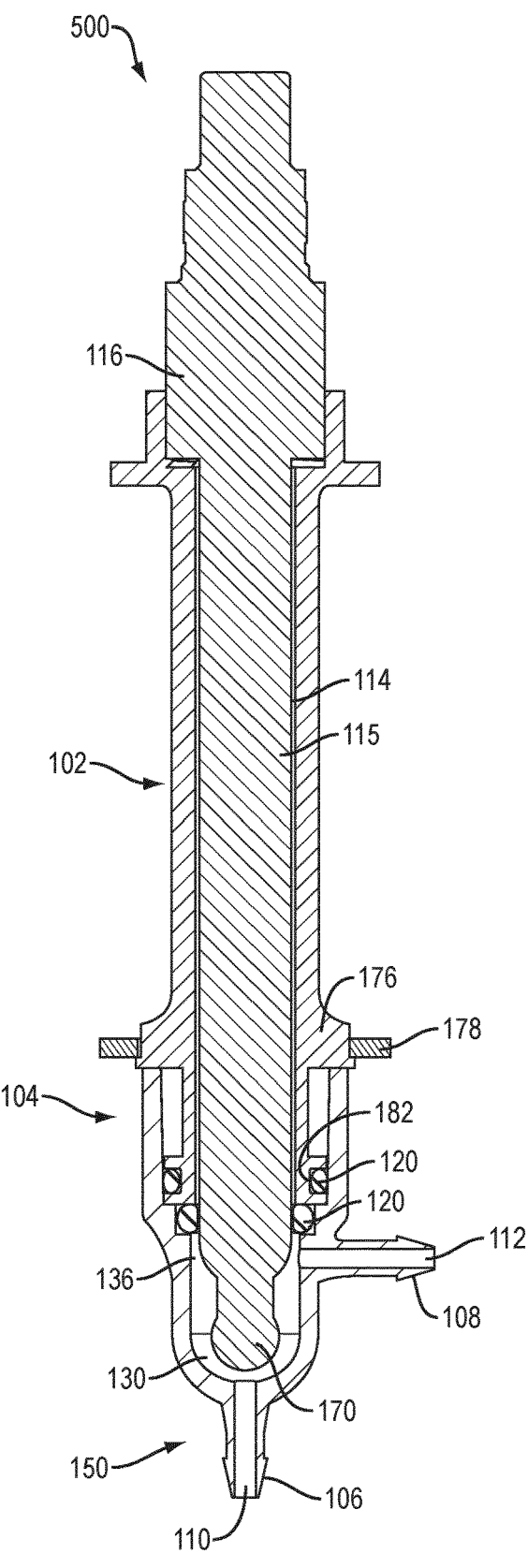
FIG. 7 depicts a front cross-section view of a probe chamber having an O-ring between a probe holder and a chamber housing probe, an O-ring between chamber housing, and a probe and a ring clip for joining a chamber housing and the probe holder, according to embodiments of the disclosure.

FIG. 7 depicts a front cross-section view of a probe chamber 500 having an O-ring 120 between a probe holder 102 and a chamber housing 104, an O-ring between chamber housing 104 and a probe 104, and a ring clip 178 for joining a chamber housing 104 and the probe holder 102, according to embodiments of the disclosure. The probe holder 102 further comprises a groove 182 for housing an O-ring 120 adjacent to an O-ring 120 between the chamber housing 104 and the probe 115, substantially similar to the groove 182 depicted in FIG. 6. As above, the chamber housing 104 may comprise a central bore 136, which when the holder 102 and the chamber housing 104 are joined, the central bore 136 and the bore 114 are in fluid communication therewith. As above, the central bore 136 and the bore 114 are optionally concentric. At a proximal end 150 of the chamber housing 104, two ports exist, an inlet port 106 and an outlet port 108. The inlet port 106 comprises an inlet channel 110 while the outlet port 108 comprises an outlet channel 112. A measurement chamber 130 may be disposed between and in fluid communication with both the inlet channel 110 and outlet channel 112. The measurement chamber 130 is in fluid communication with the central bore 136, depicting a probe tip 170 therein.

Figure 8:
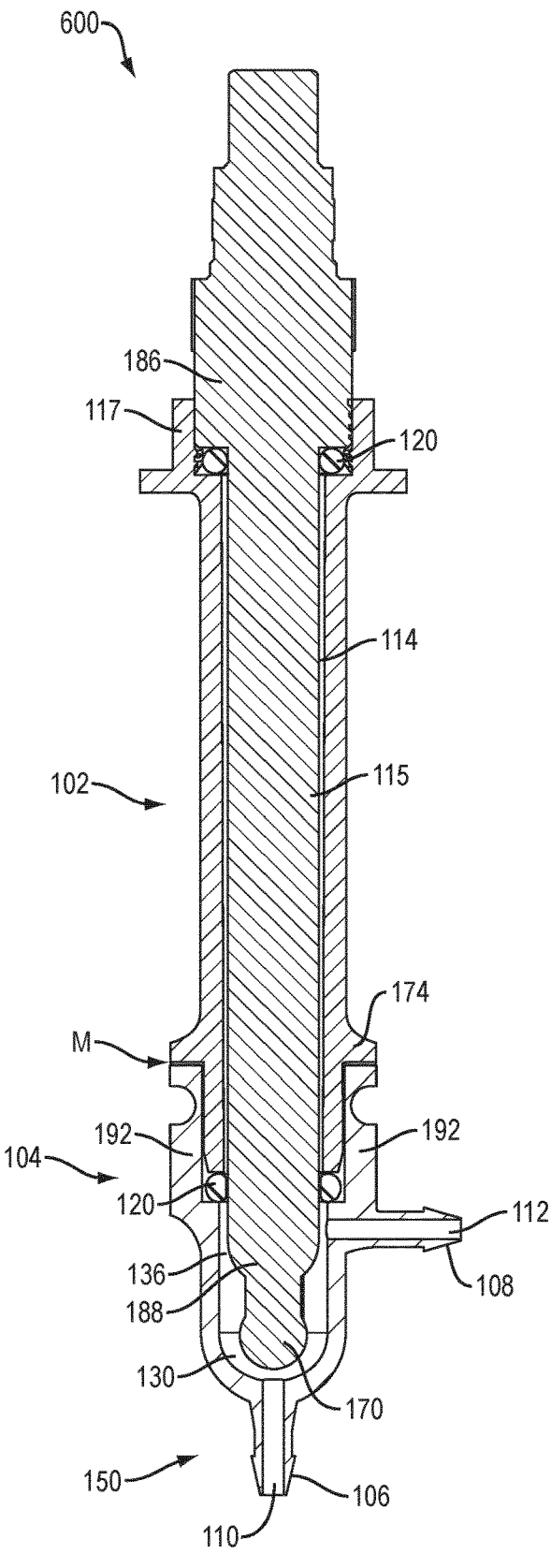
FIG. 8 depicts a front cross-section view of a probe chamber having an O-ring between a probe holder and a probe, wherein the probe holder and the chamber housing comprise shoulders for joining the chamber housing and the probe holder with a clamp, according to embodiments of the disclosure.

FIG. 8 depicts a front cross-section view of a probe chamber 600 having an O-ring between a probe holder and a probe, wherein the probe holder and the chamber housing comprise shoulders for joining the chamber housing and the probe holder with a clamp (not shown), according to embodiments of the disclosure. The probe chamber comprises an O-ring 120 between a probe holder 102 and a probe 115. The probe holder 102 comprises a first shoulder 174. The chamber housing 104 comprises a second shoulder 192 for joining the chamber housing 104 and the probe holder 102. The chamber housing 104 and the probe holder 102 adjoin at a point M. The first shoulder 174 and the second shoulder 192 can be releasably joined using a clamp. Any suitable clamp known to those in the art can be used. At least one suitable clamp is a tri-clamp or a tri-clover clamp. The tri-clamp has two faces, optionally having a gasket, which surround the first shoulder 174 and the second shoulder 192. The tri-clamp typically comprises flanged ends that mate and secure the first shoulder 174 and second shoulder 192. An O-ring 120 is disposed between a proximal portion 188, near a probe tip 170 of the probe 115 and the chamber housing 104. An O-ring 120 is disposed between a distal portion 186 of the probe 115 and a distal portion 117 of the probe holder 102. As above, the chamber housing 104 may comprise a central bore 136, which when the holder 102 and the chamber housing 104 are joined, the central bore 136 and the bore 114 are in fluid communication therewith. As above, the central bore 136 and the bore 114 are optionally concentric. At a proximal end 150 of the chamber housing 104, two ports exist, an inlet port 106 and an outlet port 108. The inlet port 106 comprises an inlet channel 110 while the outlet port 108 comprises an outlet channel 112. A measurement chamber 130 may be disposed between and in fluid communication with both the inlet channel 110 and outlet channel 112. The measurement chamber 130 is in fluid communication with the central bore 136.

The probe chamber 100, 200, 300, 400, 500, 600, the holder 102 and the chamber housing 104 may be made of any suitable plastic material. For example, the probe chamber 100, 200, 300,400, 500, 600, the holder 102 and the chamber housing 104 may be made of high-density polyethylene (HDPE), medium-density polyethylene, polypropylene, silicone, acrylonitrile-butadiene-styrene (ABS), nylon 6, nylon 66, nylon 46, polyacetal, polyether sulfone and other sterilizable polymers typically used in the bioprocessing industry. Sterilization may be accomplished by autoclaving, gamma-irradiating, ethylene oxide sterilization, or via the use of solvents, e.g., ethyl alcohol.

All ranges for formulations recited herein include ranges therebetween and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4, or 3.1 or more.

Reference throughout this specification to "one embodiment," "certain embodiments," "one or more embodiments," "some embodiments," or "an embodiment" indicates that a feature, structure, material, or characteristic described in connection with the embodiment is included in at least one embodiment of the disclosure. Therefore, the appearances of the phrases such as "in one or more embodiments," "in certain embodiments," "in one embodiment," "some embodiments," or "in an embodiment" throughout this specification are not necessarily referring to the same embodiment. Nonetheless, it is to be understood that any feature described herein can be incorporated within any embodiment(s) disclosed herein.

Publications of patent applications and patents and other non-patent references cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A probe chamber, comprising:
a holder having a bore capable of holding a sensor or probe;
a chamber housing having a central bore in fluid communication with the bore of the holder, wherein the chamber housing can be joined with the holder; and
a measurement chamber in fluid communication with the central bore, wherein the measurement chamber comprises, a gate configured to permit flow of a liquid into the measurement chamber, an inlet and an outlet and configured to receive a probe tip or sensor tip, wherein the gate is located at a terminal end of the measurement chamber such that a height of the measurement chamber along a longitudinal axis of the probe is configured to fills from a bottom to a top of the measurement chamber.

2. The probe chamber of claim 1, wherein the gate is located such that the measurement chamber floods with a fluid in a non-preferential manner.

3. The probe chamber of claim 1, wherein the measurement chamber has a minimal volume.

4. The probe chamber of claim 1, wherein the chamber housing or the holder is formed of one of high-density polyethylene (HDPE), polypropylene, acrylonitrile-butadiene-styrene (ABS), nylon 6, nylon 66, nylon 46, polyacetal, or polyether sulfone.

5. The probe chamber of claim 1, wherein the chamber housing or the holder is formed of any gamma compatible and/or autoclavable material.

6. The probe chamber of claim 1 further comprising a thermoplastic elastomer at a proximal end.

7. The probe chamber of claim 1 wherein the holder has a threaded boss for receiving a probe.

8. The probe chamber of claim 1 wherein the holder and the chamber housing are joined via threads, a press-fit, a ring clip, a tri-clamp, or a snap-fit.

9. The probe chamber of claim 1, wherein an O-ring is disposed between the holder and the chamber housing.

10. The probe chamber of claim 1, wherein the inlet is disposed adjacent to a proximal end and below the outlet.

11. The probe chamber of claim 1, wherein the probe or sensor is a thermocouple, a pH sensor, a turbidity or absorbance sensor, or a conductivity sensor.

12. A system, comprising:
the probe chamber of claim 1; and
a sampler, wherein the sampler can be joined to the probe chamber.

13. The system of claim 12, wherein the sampler comprises a needle and having a tip for drawing a sample from the probe chamber and a tube connected thereto.

14. The system of claim 13, wherein the sampler comprises a plurality of needles and tubes.

15. The system of claim 12, further comprising a probe or sensor housed within the probe chamber.

16. A method for calibrating the probe or sensor using the probe chamber of claim 1, comprising:
drawing a solution sample from the measurement chamber of the holder having the probe or sensor housed therein;
assessing and/or comparing the solution sample using reference probes;
computing a difference value; and
correcting a probe or sensor drift using the difference value.

17. The method of claim 16, wherein a needle of a sampler pierces the measurement chamber and delivers the solution sample to a test tube for testing.

18. The method of claim 16, wherein a response time of the probe is minimized.

19. The method of claim 16, wherein the measurement chamber or holder comprises a material gamma compatible and/or autoclavable material.

20. The method of claim 16, wherein a flow rate of the solution sample into the measurement chamber is approximately 1 to 30 mL/min, 30-100 mL/min, or 100-2000 mL/min.

* * * * *